(12) United States Patent
Fan

(10) Patent No.: US 8,017,271 B2
(45) Date of Patent: *Sep. 13, 2011

(54) ALKALINE ELECTROCHEMICAL CELL WITH A BLENDED ZINC POWDER

(75) Inventor: Danan Fan, Westlake, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/731,214

(22) Filed: Mar. 25, 2010

(65) Prior Publication Data

US 2010/0178558 A1    Jul. 15, 2010

Related U.S. Application Data

(62) Division of application No. 12/035,115, filed on Feb. 21, 2008, now Pat. No. 7,718,316, and a division of application No. 10/878,223, filed on Jun. 28, 2004, now Pat. No. 7,364,819.

(51) Int. Cl.
  *H01M 4/42* (2006.01)
(52) U.S. Cl. ....................................... 429/229
(58) Field of Classification Search ............... None
  See application file for complete search history.

(56) References Cited

U.S. PATENT DOCUMENTS

| | | |
|---|---|---|
| 5,139,900 A | 8/1992 | Tada et al. |
| 5,198,315 A | 3/1993 | Tada et al. |
| 5,209,995 A | 5/1993 | Tada et al. |
| 6,015,636 A | 1/2000 | Goldstein et al. |
| 6,022,639 A | 2/2000 | Urry |
| 6,284,410 B1 | 9/2001 | Durkot et al. |
| 6,428,932 B1 | 8/2002 | Shinoda et al. |
| 6,472,103 B1 | 10/2002 | Durkot et al. |
| 6,521,378 B2 | 2/2003 | Durkot et al. |
| 6,706,220 B1 | 3/2004 | Glaeser |
| 6,746,509 B2 | 6/2004 | Oyama et al. |
| 7,169,504 B2 | 1/2007 | Armacanqui et al. |
| 7,332,247 B2 | 2/2008 | Horn |
| 7,718,316 B2 * | 5/2010 | Fan ............... 429/229 |
| 2002/0155352 A1 | 10/2002 | Durkot et al. |
| 2003/0087153 A1 | 5/2003 | Durkot et al. |
| 2003/0203281 A1 | 10/2003 | Melzer et al. |
| 2004/0013940 A1 | 1/2004 | Horn |
| 2004/0033418 A1 | 2/2004 | Armacanqui et al. |
| 2004/0045404 A1 | 3/2004 | Oyama et al. |
| 2004/0115532 A1 | 6/2004 | Malservisi et al. |

FOREIGN PATENT DOCUMENTS

| | | |
|---|---|---|
| JP | 02270164 A | 9/2002 |
| WO | 0048260 A1 | 8/2000 |
| WO | 01040529 A2 | 6/2001 |
| WO | 03043103 A2 | 5/2003 |
| WO | 2004012886 A2 | 2/2004 |

* cited by examiner

*Primary Examiner* — Jonathan Crepeau
(74) *Attorney, Agent, or Firm* — Robert C. Baraona

(57) ABSTRACT

An electrochemical cell with a blended zinc powder is disclosed. The blended zinc powder includes selected portions of a first zinc powder and a second zinc powder. In a preferred embodiment, the first and second powders are divided into groups based on ranges in their particle size distribution. Particle characteristics such as roughness and elongation are used to selected groups of both powders that are combined to produce the blended zinc powder. The blended zinc powders enable battery manufacturers to maximize the cell's run time while minimizing the cost of the zinc.

10 Claims, 4 Drawing Sheets

| LOT # | POWDERS | 1K MA CONT 21C-T0 1V | 1K MW 3S/7S 24HR/DY 21C-T0 .9V | 1K MW CONT 21C-T0 1V |
|---|---|---|---|---|
| 107 | (A1 <75μm) + (A2 75-150μm) + (A3 >150μm) | 108.6% | 115.2% | 108.5% |
| 106 | (A1 <75μm) + (A2 75-150μm) + (B3 >150μm) | 113.7% | 111.4% | 117.0% |
| 105 | (A1 <75μm) + (B2 75-150μm) + (A3 >150μm) | 109.7% | 102.5% | 106.4% |
| 104 | (B1 <75μm) + (A2 75-150μm) + (A3 >150μm) | 112.2% | 113.9% | 110.6% |
| 103 | (B1 <75μm) + (B2 75-150μm) + (A3 >150μm) | 111.9% | 113.9% | 106.4% |
| 102 | (B1 <75μm) + (B2 75-150μm) + (A3 >150μm) | 110.1% | 105.1% | 108.5% |
| 101 | (A1 <75μm) + (B2 75-150μm) + (B3 >150μm) | 110.0% | 108.9% | 108.5% |
| 100 | (B1 <75μm) + (B2 75-150μm) + (B3 >150μm) | 100.0% | 100.0% | 100.0% |

Fig. 6

ALKALINE ELECTROCHEMICAL CELL WITH A BLENDED ZINC POWDER

CROSS REFERENCE TO RELATED APPLICATION

This application is a divisional of U.S. patent application Ser. No. 12/035,115, now U.S Pat. No. 7,718,316, filed Feb. 21, 2008, and 10/878,223 filed 06/28/2004, now U.S. Pat. No. 7,364,819, issued Apr. 29, 2008, both entitled "ALKALINE ELECTROCHEMICAL CELL WITH A BLENDED ZINC POWDER," the entire disclosures of which are incorporated herein by reference.

BACKGROUND OF THE INVENTION

This invention generally relates to alkaline electrochemical cells. More particularly, this invention is concerned with alkaline cells having an anode that contains blended zinc powder.

Cylindrically shaped electrochemical cells are suitable for use by consumers in a wide variety of devices such as flashlights, radios and cameras. Batteries used in these devices typically employ a cylindrical metal container to house two electrodes, a separator, a quantity of electrolyte and a closure assembly that includes a current collector. Typical electrode materials include manganese dioxide as the cathode and zinc as the anode. An aqueous solution of potassium hydroxide is a common electrolyte. A separator, conventionally formed from one or more strips of paper, is positioned between the electrodes. The electrolyte is readily absorbed by the separator and anode.

Commercially available cylindrical alkaline batteries use an anode that includes zinc in particulate form. The anode is a gel that has absorbed an aqueous electrolyte. The zinc particles are uniformly dispersed within the gel so that particle-to-particle contact establishes an electrically conductive matrix throughout the anode. A current collector contacts the zinc and provides an electrically conductive path between the anode and one of the cell's terminals.

Due to the ever present desire to provide consumers with better performing batteries, battery engineers are constantly striving to improve the length of time that a battery will power a consumer's device. At the same time, the need to reduce the cost of the cell, while maintaining the cell's service performance, has become paramount. Previous attempts to improve service have included modifications to the zinc's alloy, changes to the shape of the zinc particles, modifications to the zinc powder's particle size distribution and forming free flowing zinc particles into agglomerates of zinc. For example, U.S. Pat. No. 6,022,639 describes incorporating zinc flakes into zinc powder that is used in an alkaline electrochemical cell. Unfortunately, the use of zinc flakes is known to substantially increase the viscosity of the gelled anode containing the zinc flake. The increase in viscosity can cause processing problems that adversely impact the efficiency of the cell manufacturing process. U.S. Pat. No. 6,284,410 describes adding zinc fines or zinc dust to a zinc powder. The addition of fines or dust is described as beneficial to the cell's overall performance. However, adding the fines or dust is known to increase the viscosity of the gelled anode which can cause processing problems in the cell manufacturing process. Numerous attempts have been made to improve the cell's run time by alloying one or more elements, such as bismuth, indium, aluminum, lead, tin, or manganese, with the zinc. Alloying elements with zinc has proven effective at increasing the service of the cell but the alloying process incurs additional expense at the zinc manufacturing facility which ultimately increases the cost of the cell. Forming zinc agglomerates from free flowing zinc powder is described in U.S. Pat. No. 7,332,247. While agglomerates do improve the cell's run time on certain service tests, the process steps needed to form the agglomerates also increases the cost of the zinc and thus the cost of the battery. All of the changes to the zinc described above can be collectively described as an industry wide effort to engineer the zinc powder to improve cell performance by altering certain physical and/or chemical characteristics of the zinc powder. However, there continues to be a need for further advances in the development of zinc powders that will enable service improvements while minimizing any additional cost to the cell or, alternatively, reducing the cost of the zinc while maintaining the cell's service.

BRIEF SUMMARY OF THE INVENTION

The present invention provides an electrochemical cell with zinc powder that is economical to manufacture and provides desirable run time when used in a device.

In one embodiment, the electrochemical cell of the present invention includes a first electrode that is a blend of at least a first powder and a second powder. Both the first and second powders have particles within a common particle size range. The first powder's particles in the common particle size range have a roughness index value that is at least 2.0 percent higher than the roughness index value of the second powder's particles in the common particle size range.

The present invention also relates to an electrochemical cell that includes a mixture of zinc powders. The mixture includes zinc particles from a first powder and at least a second powder. The range of particle sizes in the first powder and the range of particle sizes in the second powder do not overlap.

The present invention also relates to an electrochemical cell that includes a mixture of zinc powders obtained by segregating a first powder into at least two groups based on particle size, segregating a second powder into at least two groups based on particle size, wherein at least one group from the first powder and one group from the second powder have a common particle size range and the group in the first powder's common particle size range has an average roughness index value that is at least 2.0 percent higher than the average roughness index value of the group in the second powder's common particle size range. Then blending the group from the first powder's common particle size range with at least one group from the second powder.

The present invention also relates to a process for producing a blended zinc powder. The process includes the following steps. Segregating a first powder into at least two groups based on particle size. Segregating a second powder into at least two groups based on particle size. Blending at least one group from the first powder with at least one group from the second powder thereby forming the blended zinc powder. At least one group from the first powder and one group from the second powder have a common particle size range. The particles in the first powder's common particle size range have an average roughness index value that is at least 2.0 percent higher than the average roughness index value of the particles in the second powder's common particle size range.

BRIEF DESCRIPTION OF THE DRAWINGS

FIG. 6 is a chart showing test results from three service tests.

DETAILED DESCRIPTION OF THE INVENTION

Figure 1:
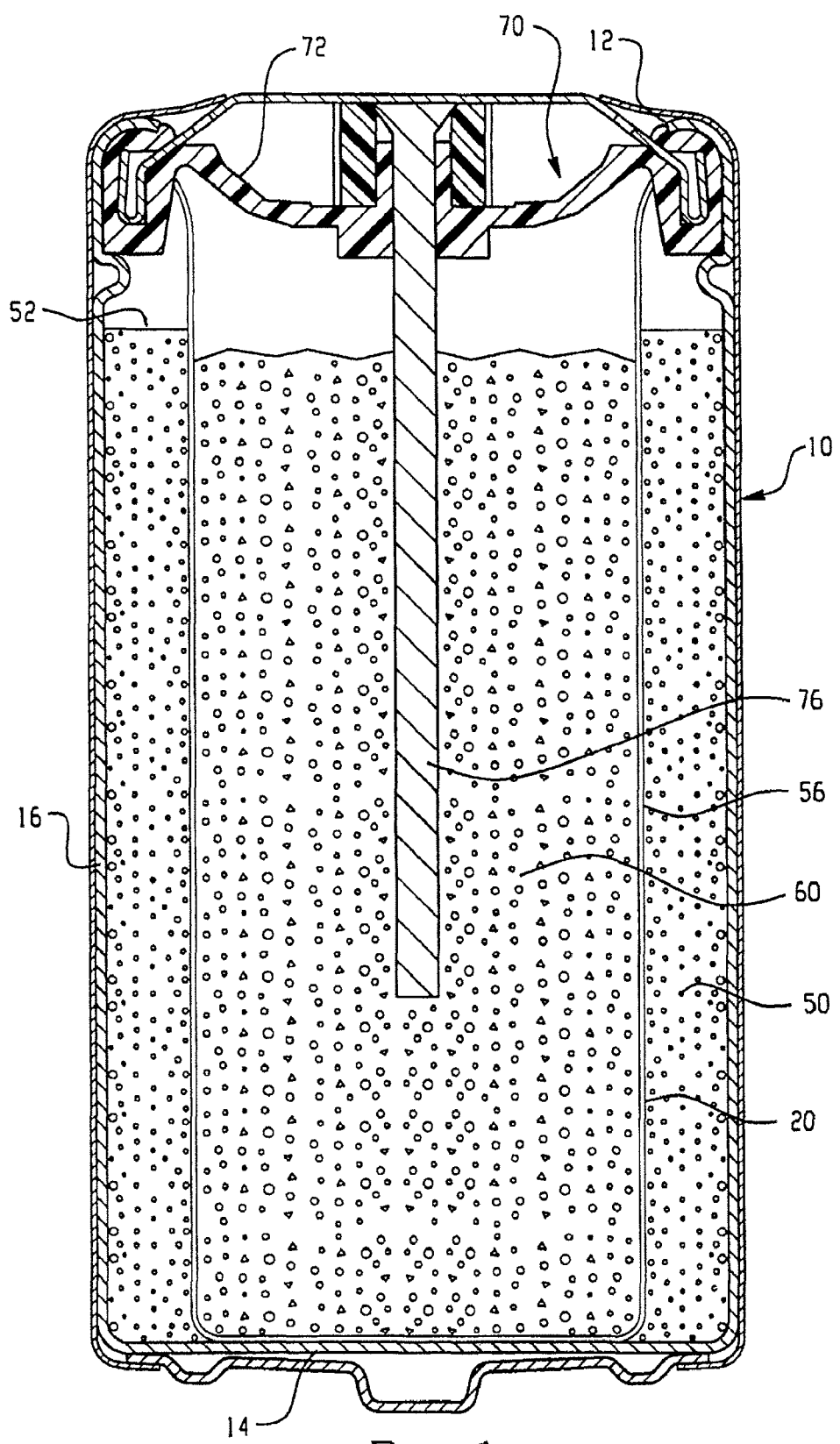
FIG. 1 is a cross-sectional view of an electrochemical cell of this invention.

Referring now to the drawings and more particularly to FIG. 1, there is shown a cross-sectional view of an assembled electrochemical cell of this invention. Beginning with the exterior of the cell, the cell's components are the container 10, first electrode 50 positioned adjacent the interior surface of container 10, separator 20 contacting the interior surface 56 of first electrode 50, second electrode 60 disposed within the cavity defined by separator 20 and closure assembly 70 secured to container 10. Container 10 has an open end 12, a closed end 14 and a sidewall 16 therebetween. The closed end 14, sidewall 16 and closure assembly 70 define a volume in which the cell's electrodes are housed.

First electrode 50 includes a mixture of manganese dioxide, graphite and an aqueous solution containing potassium hydroxide. The electrode is formed by disposing a quantity of the mixture containing manganese dioxide into the open ended container and then using a ram to mold the mixture into a solid tubular shape that defines a cavity which is concentric with the sidewall of the container. First electrode 50 has a ledge 52 and an interior surface 56. Alternatively, the cathode may be formed by preforming a plurality of rings from the mixture comprising manganese dioxide and then inserting the rings into the container to form the tubularly shaped first electrode.

Second electrode 60 is a homogenous mixture of an aqueous alkaline electrolyte, a blend of two or more zinc powders, and a gelling agent such as crosslinked polyacrylic acid. The aqueous alkaline electrolyte comprises an alkaline metal hydroxide such as potassium hydroxide, sodium hydroxide, or mixtures thereof. Potassium hydroxide is preferred. The gelling agent suitable for use in a cell of this invention can be a crosslinked polyacrylic acid, such as Carbopol 940®, which is available from B.F. Goodrich, Performance Materials Division, Cleveland, Ohio, USA. Carboxymethyylcellulose, polyacrylamide and sodium polyacrylate are examples of other gelling agents that are suitable for use in an alkaline electrolyte solution. The blended zinc powder may be pure zinc or an alloy comprising an appropriate amount of one or more of the metals selected from the group consisting of indium, lead, bismuth, lithium, calcium and aluminum. A suitable anode mixture contains 67 weight percent zinc powder, 0.50 weight percent gelling agent and 32.5 weight percent alkaline electrolyte having 40 weight percent potassium hydroxide. The quantity of zinc can range from 63 percent by weight to 70 percent by weight of the anode. Other components such as gassing inhibitors, organic or inorganic anticorrosive agents, binders or surfactants may be optionally added to the ingredients listed above. Examples of gassing inhibitors or anticorrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like.

The second electrode may be manufactured by combining the ingredients described above into a ribbon blender or drum mixer and then working the mixture into a wet slurry.

Electrolyte suitable for use in a cell of this invention is a 37 percent by weight aqueous solution of potassium hydroxide. The electrolyte may be incorporated into the cell by disposing a quantity of the fluid electrolyte into the cavity defined by the first electrode. The electrolyte may also be introduced into the cell by allowing the gelling medium to absorb an aqueous solution of potassium hydroxide during the process used to manufacture the second electrode. The method used to incorporate electrolyte into the cell is not critical provided the electrolyte is in contact with the first electrode 50, second electrode 60 and separator 20.

Closure assembly 70 comprises closure member 72 and current collector 76. Closure member 72 is molded to contain a vent 82 that will allow the closure member 72 to rupture if the cell's internal pressure becomes excessive. Closure member 72 may be made from Nylon 6,6 or another material, such as a metal, provided the current collector 76 is electrically insulated from the container 10 which serves as the current collector for the first electrode. Current collector 76 is an elongated nail shaped component made of brass. Collector 76 is inserted through a centrally located hole in closure member 72.

The separator is made from nonwoven fibers. One of the separator's functions is to provide a barrier at the interface of the first and second electrodes. The barrier must be electrically insulating and ionically permeable. A suitable separator is disclosed in WO 03/043103.

The blended zinc powder that is used in a cell of this invention is a combination of at least a first zinc powder and a second zinc powder. The characteristics of the first and second powders must be selected to provide service and/or cost advantages that are not readily obtainable using a conventional zinc powder that has been produced in a zinc powder production process wherein the full range of zinc particles in the zinc powder's particle size distribution are randomly produced. In such a process, the particles have basic physical characteristics that are determined by the type of process and the specific conditions used to control the process. The physical characteristics imparted to the particles by the process have been recognized by the inventor as one of the features that can significantly impact how efficiently the zinc will discharge in an electrochemical cell. For example, the inventor has recognized that characteristics of the zinc particles, such as particle roughness and/or particle elongation, in combination with other physical parameters, such as particle size distribution, can be used to select a first zinc powder, or a specific particle size distribution within the first zinc powder, which can be combined with a second zinc powder, or a specific particle size distribution within the second zinc powder, to create a blended zinc powder that will provide the desired service or cost advantages. As described above, the battery industry that uses zinc powder as an electrochemically active material and the zinc manufacturers that supply the zinc powder have tried to improve the cell's service, also known as the cell's run time, by altering physical or chemical characteristics of the zinc such as, particle size distribution, particle shape and the chemical elements that are alloyed with the zinc. However, the roughness of the particles, as measured on a roughness index, and the elongation of the particles, as measured on an elongation index, have not been used as criteria to select zinc powders that could be mixed together to create a blended zinc powder that would provide service and/or cost advantages.

Figure 2:
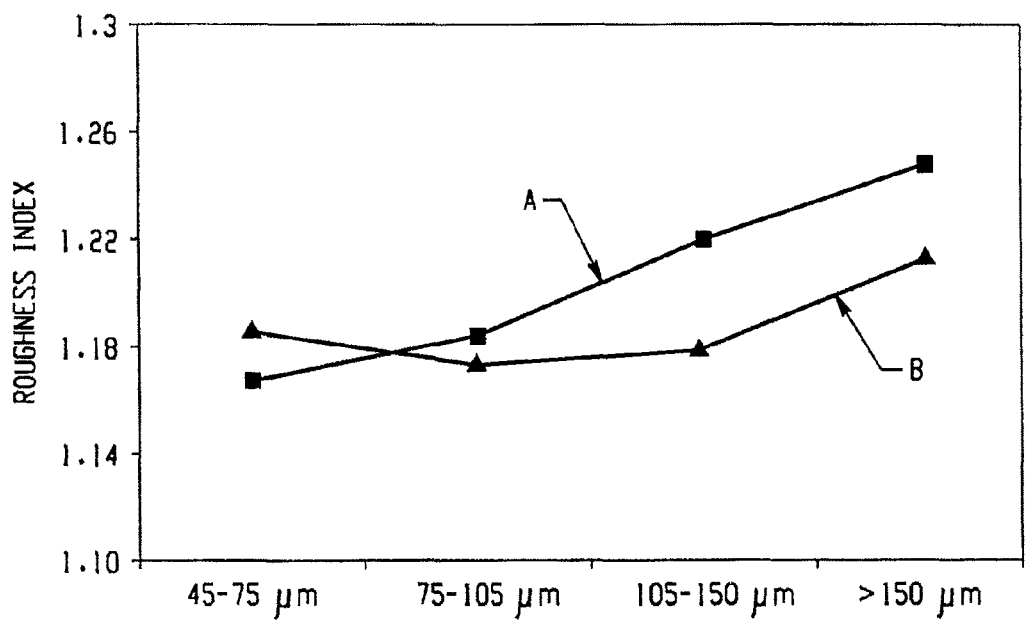
FIG. 2 is a graph of roughness index versus particle size ranges for two zinc powders.

FIG. 2 is a chart of the roughness of two zinc powders identified herein as powder A and powder B. Powder A was purchased from N.V. UMICORE, S.A., in Brussels, Belgium and is identified as BIA 115. This zinc powder is an alloy that contains 100 ppm bismuth, 200 ppm indium, and 100 ppm aluminum. The powder's $D_{50}$, which is a measurement used to characterize the powder's particle size, was approximately 115. A centrifugal atomization process, as generally described in WO 00/48260, which published on Aug. 17, 2000, was used to produce the zinc powder. Powder B had the same alloy composition as powder A and was also purchased from UMICORE. Powder B was produced in a gas atomization process which is a conventional manufacturing process used to produce powder from a stream of molten zinc. A third process used to manufacture zinc powder is known as impulse atomization and is described in WO 2004/012886. The data in FIG. 2 was generated by using screens to sieve zinc powders that were produced in either a centrifugal atomization process or a gas atomization process. The powders were sieved as received from the manufacturer thereby segregating each of the powders into four groups based on particle size range. The ranges were 45 to 75 microns, 75 to 105 microns, 105 to 150 microns and greater than 150 microns. The roughness of each segregated group was then characterized using two dimensional image analysis. The image analysis technique used an Olympus SZX12 microscope in combination with a digital camera to photograph zinc particles under sufficient magnification to allow the perimeter of individual particles to be accurately measured. The technique involved evenly distributing a plurality of particles on a piece of glass which was then placed within the viewing field of the microscope with transmitted light illuminating the particles. The particles were arranged to minimize or eliminate particle to particle contact. The magnification of the microscope was selected to allow at least ten pixels for small particles. Digital pictures were then taken of different areas of the sample. Each picture had to contain at least two particles that did not touch another particle. Multiple pictures were taken to obtain 1000 images of particles that did not contact another particle. Microsuite software, produced by Olympus America Inc. of Melville, N.Y., was used to process the data. The roughness index of each group was determined by analyzing images of 1000 particles. For each particle, the roughness was determined by dividing the perimeter of the particle's image by the perimeter of that particle's equivalent ellipse which is defined as an ellipse that has the same area as the particle and its major axis is equal to the longest dimension of the particle's image. The roughness index for each group was calculated by averaging the roughness values of the 1000 particles. A higher roughness index means that the particles are rougher than particles with a lower roughness index. As can be seen in FIG. 2, three of the four groups in powder A had a higher average roughness index value than the corresponding groups in powder B. In particular, the particles in powder A that were separated into the 105 to 150 micron range had an average roughness index value (1.220) that was approximately 3.4 percent higher than the average roughness index value (1.180) of the corresponding group from powder B. Similarly, the particles in powder A that were separated into the group consisting of particles greater than 150 microns had an average roughness index value (1.245) that was approximately 2.9 percent higher than the average roughness index value (1.210) of the corresponding group from powder B. Preferably, the average roughness index differential between two powders useful in a cell of this invention is at least 2.0 percent, more preferably 3.0 percent, even more preferably 3.5 percent.

Figure 3:
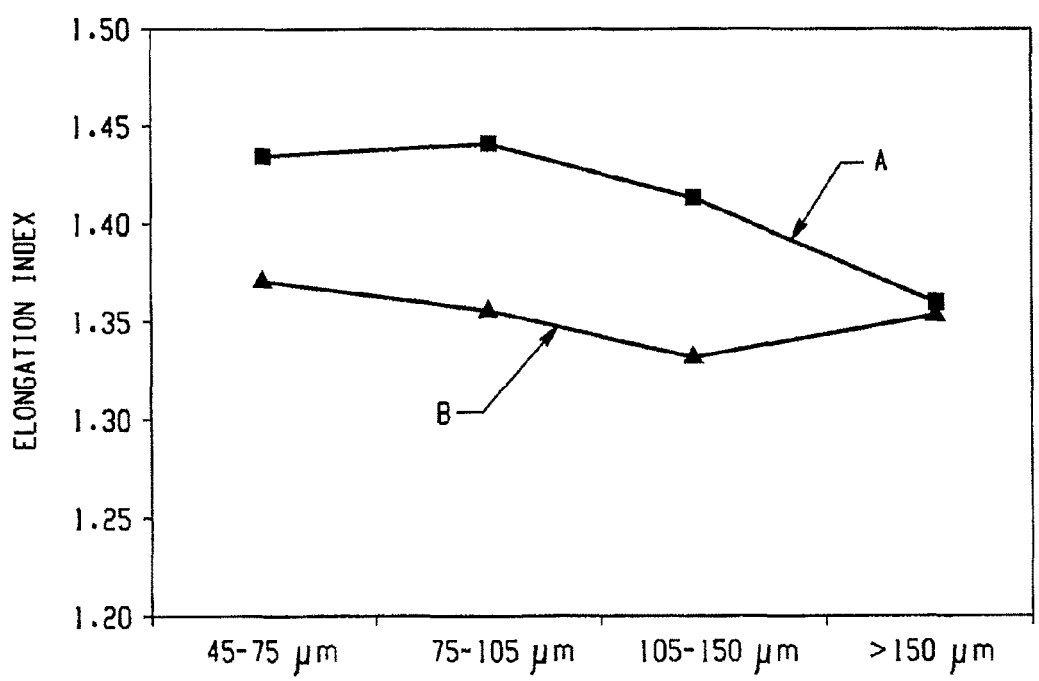
FIG. 3 is a graph of elongation index versus particle size ranges for two zinc powders.

FIG. 3 is a chart of the elongation index values of the two zinc powders previously identified as powder A and powder B. The elongation of 1000 particles from each group in powders A and B were characterized using the two dimensional image analysis equipment described above. The elongation index value of each particle was calculated by dividing the major axis of the equivalent ellipse by the Heywood's diameter of the particle's image. The Heywood diameter is the diameter of a circle that has an area that is equivalent to the area of the particle's image. The average elongation index value for each group was determined by averaging the individual elongation values for the 1000 particles in that group's sample. The data points in FIG. 3 clearly show that three of the four groups in powder A consisted of particles that had an average elongation index that was at least 4 percent higher than the corresponding group in powder B. Preferably, an average elongation index differential between two powders useful in cell of this invention is at least 3.0 percent, more preferably 3.5 percent, even more preferably 4.0 percent.

Figure 4:
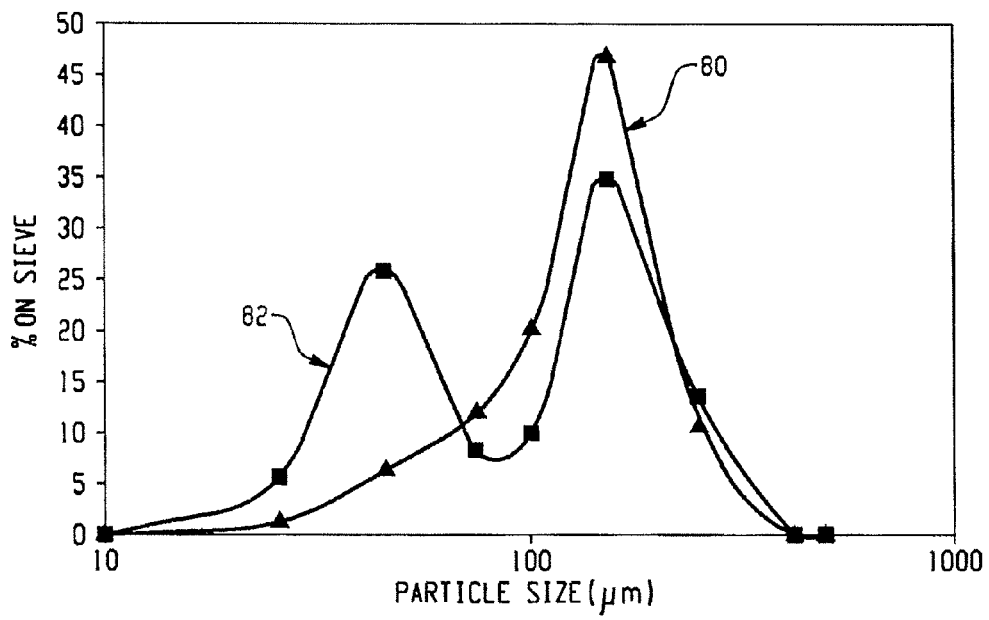
FIG. 4 is a graph of two particle size distributions.

In addition to selecting a first zinc powder and a second zinc powder, or segregated groups of zinc powders, based on their average roughness index values and average elongation index values, the particle size distribution of the blended zinc powder that is obtained by blending the selected first powder and second powder is known to significantly influence the processability and discharge efficiency of the cell containing the blended zinc. Zinc powders that have a particle size distribution with a single apex are known herein as unimodal particle size distribution zinc powders. In FIG. 4, line 80 is an example of a unimodal particle size distribution. If a zinc powder has a particle size distribution with two or more peaks that define a trough therebetween, the zinc powder is known herein as a multimodal particle size distribution zinc powder. In FIG. 4, line 82 is an example of a multimodal particle size distribution. Zinc powders with a unimodal particle size distribution are often preferred over zinc powders with a multimodal particle size distribution because unimodal powders are easier to process. Multimodal powders that contain a high percentage of zinc fines inherently increase the viscosity of the gelled anode that contains the multimodal powder. The increase in viscosity can cause processing problems in the anode distribution and dispensing equipment that is used to transport and dispense the anode.

Preferably, the first and second zinc powders used in a cell of this invention are zinc alloys. The alloys contain the same chemical elements, such as bismuth, indium and aluminum, and the quantities of the chemical elements in each alloy are the same.

Figure 5:
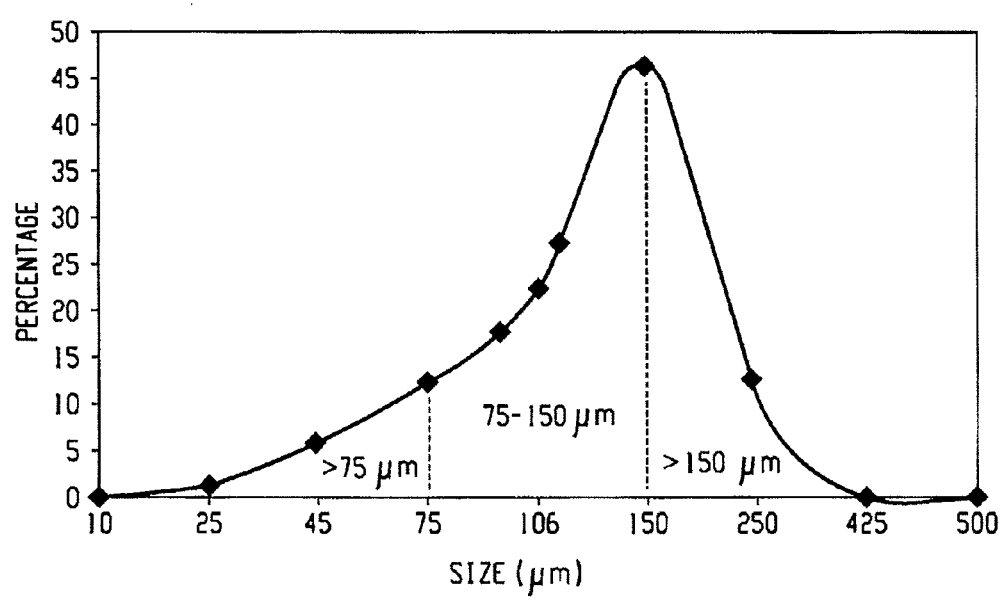
FIG. 5 is a graph of a particle size distribution.

In one embodiment, a cell of this invention includes a first zinc powder that has a unimodal particle size distribution but at least one selected portion of the distribution has been replaced with a similar distribution of zinc particles from a second zinc powder. The particles from the second zinc powder have higher average roughness value than the powders in the first powder that have been replaced. For example, FIG. 5 shows a distribution of zinc powders that has been divided into three selected portions. The first portion includes particles that flowed through a screen that has 75 micron openings. The second portion includes particles that flowed through a screen that has 150 micron openings but did not flow through a screen with 75 micron openings. The third portion includes particles that would not flow through a screen with 150 micron openings. Blended zinc powders useful in a cell of this invention can be obtained by replacing a selected portion of a zinc powder that has a lower average roughness value with a selected portion of a different zinc powder that has a higher average roughness index value. Preferably, the particle size distribution of the selected portion of zinc powder does not overlap the particle size distribution of the zinc powder with which it is blended. A first particle size distribution is considered not to overlap a second particle size distribution if the first distribution is screened or otherwise segregated using a state of the art commercially available process that is at least 98 percent effective, based on the weights of the zinc powders before and after screening, in limiting the powder's particle sizes within the desired particle size ranges. While 100 percent segregation of powders is desirable, some processes are not able to prevent smaller zinc particles from clinging to larger particles thereby retaining some of the smaller particles in the distributions of the larger particles. Alternatively, another blended zinc powder useful in a cell of this invention could be obtained by replacing a selected portion of a zinc powder that has a higher average roughness index value with a selected portion of a different zinc powder that has lower average roughness index value. Regardless of which powder is segregated into one or more groups that are then blended with one or more groups from another powder, the net result is a blended zinc powder that has had a selected portion, based on particle size distribution and surface roughness, of its zinc particles replaced with particles from another zinc powder's selected portion.

In another embodiment, a blended zinc powder is produced by blending a selected group from a first powder with a second powder that has not been segregated into groups based on surface roughness and particle size range. The particles in the first powder's selected group have an average roughness index value that is at least two percent higher than the average roughness index value of the particles in the second powder from the same particle size range which is known herein as the "common" particle size range. For example, if the particles from the first powder's selected group have a particle size range between 75 microns and 105 microns and the second powder has at least some of its particles in the 75 to 105 micron range, then the first and second powder have particles in a common particle size range. This embodiment provides for the blending of a selected "common" group from a first powder with a second powder having particles in the same "common" particle size range as the first powder's provided the particles from the first powder are rougher than the particles in the second powder's common particle size range.

In another embodiment, a blended zinc powder useful in a cell of this invention can be obtained by mixing two zinc powders that have essentially the same particle size distributions but the average roughness and/or elongation index values of the first powder's selected portion is higher than the average roughness and/or elongation index values of the same selected portion in the second zinc powder. In this embodiment, the particle size distribution of the blended zinc powder is the same as the particle size distributions of the two powders that are blended but the blended powder contains particles that are rougher and/or more elongated that the particles in one of the powders.

Blending zinc powders that have different roughness and/or elongation index values provides cell manufacturers with the ability to tailor the cost-to-performance characteristics of the blended zinc powder. For example, if a first zinc powder is know to provide superior service in an electrochemical cell but the powder is more expensive than another zinc powder which provides less run time, the cell manufacturer can elect to remove a selected portion of the less expensive powder and replace it with a portion of the more expensive powder. The result is a blended powder that is less expensive than the more expensive powder and, as shown in FIG. 6, the service performance of the cells containing the blended zinc may be equal to or better than the service performance of the cells that contain only the more expensive zinc. The ability to tailor the cost-to-performance ratio of the blended powder provides the cell designer with an option that is not available with unblended zinc powders.

A process that can be used to produce blended zinc powders for use in a cell of this invention includes the following steps. Segregating a first powder into at least two groups based on particle size. Segregating a second powder into at least two groups based on particle size. Wherein at least one group from the first powder and one group from the second powder have a common particle size range and the particles in the first powder's common particle size range have an average roughness index value that is at least 2.0 percent higher than the average roughness index value of the particles in the second powder's common particle size range. Then blending at least one group from the first powder with at least one group from the second group thereby forming a blended zinc powder.

The term "blended" when used in the phrase "blended zinc powder" is intended to describe two or more zinc powders that have been mixed, tumbled, stirred or otherwise physically agitated to provide a homogenous distribution of zinc particles from the two or more zinc powders.

To illustrate the service advantages that can be obtained by using blended zinc powders of the present invention, eight lots of AA-size batteries, having a cell construction similar to that shown in FIG. 1 and described above, were manufactured and discharged on three high rate discharge tests. The cathodes, separators, electrolyte, seal assemblies and anode formulas, other than the zinc powder, used in each cell were identical. The zinc powders used in each lot were obtained as follows. A first zinc powder, designated earlier as powder A, was obtained from UMICORE. This powder was an alloy of zinc containing 100 ppm bismuth, 200 ppm indium and 100 ppm aluminum, as previously described. The powder was produced in a centrifugal atomization process and had a $D_{50}$ of 115 microns. Powder A was screened to produce a first group, designated A-1, with particles that passed through a screen with 75 micron openings, a second group, designated A-2, with particles that did flow through a screen with 150 micron openings but would not flow through a screen with 75 micron openings, and a third group, designated A-3, with particles that would not flow through a screen with 150 micron openings. A second powder, designated earlier as powder B, was also obtained from UMICORE. This powder, which was an alloy of zinc containing 100 ppm of bismuth, 200 ppm of indium and 100 ppm of aluminum, was produced in a centrifugal atomization process and had a $D_{50}$ of 160 microns. Powder B was also screened to produce a first group, designated B-1, with particles that passed through a screen with 75 micron openings, a second group, designated B-2, with particles that did flow through a screen with 150 micron openings but would not flow through a screen with 75 micron openings, and a third group, designated B-3, with particles that would not flow through a screen with 150 micron openings. Eight different blended zinc powders, designated lots 100 to 107 in FIG. 6, were obtained by blending various combinations of the groups from the two zinc powders. Lot 100 contained only zinc powder from powder B. Lot 101 contained groups A-1, B-2 and B-3. In this blend, the particle size range of the particles from powder A was less than the particle size range of the particles from powder B. Lot 102 contained groups B-1, A-2 and B-3. Lot 103 contained groups B-1, B-2 and A-3. Lot 104 contained groups B-1, A-2 and A-3. Lot 105 contained groups A-1, B-2 and A-3. Lot 106 contained groups A-1, A-2 and B-3. Lot 107 contained groups A-1, A-2 and A-3. The data in FIG. 6 was obtained by discharging five batteries from each lot in each of the following three discharge tests which were all done in a 21° C. environment. In the first discharge test, each cell was discharged continuously at one amp until the cell's closed circuit voltage dropped below 1.0 volt. In the second discharge test, each cell was discharged repeatedly at one watt for three seconds and then allowed to rest for seven seconds. This discharge regime was repeated continuously until the cell's closed circuit voltage dropped below 0.9 volt. In the third discharge test, each cell was discharged continuously at one watt until the cell's closed circuit voltage dropped below 1.0 volt. The amount of time each cell remained on test and above the voltage cutoff was recorded and then averaged to obtain an average run time for each lot on each test. The average discharge times of the cells in lot 100 were selected as the standard against which all other cell discharge times were normalized. The data in FIG. 6 clearly shows that the cells that contained blended zinc powder (lots 101 through 106, inclusive) provided substantially higher service than the cells that contained only powder B (lot 100) and, furthermore, the cells that contained the blended zinc powder provided more minutes of run time than the cells that contained only powder A on both the one amp continuous test and the one watt continuous test. Clearly, the range of run times in lots 101 through 106 demonstrate that the mixing of groups of zinc powders, segregated by particle size distributions, provides cell manufacturers with the ability to choose the desired level of run time by selecting which groups to combine into a blended zinc powder.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

I claim:

1. An electrochemical cell comprising a first electrode including a mixture of zinc powders, said mixture comprising zinc particles from a first powder and zinc particles from at least a second powder, wherein the range of particle sizes in the first powder and the range of particle sizes in the second powder do not overlap, wherein said mixture of zinc powders have a multimodal particle size distribution and wherein the first powder's particles have either: a) an average roughness index value that is at least 2.0 percent higher than an average roughness index value of the second powder's particles or b) an average elongation index value that is at least 3.0 percent higher than an average elongation index value of the second powder's particles.

2. The electrochemical cell of claim 1, wherein said first powder's particles have a particle size less than 75 microns and said second powder's particles have a particle size greater than 75 microns.

3. The electrochemical cell of claim 1, wherein said first powder's particles have a particle size between 75 microns and 150 microns and said second powder's particles comprise a first group having a particle size greater than 150 microns and a second group having a particle size less less than 75 microns.

4. The electrochemical cell of claim 1, wherein said first powder's particles have a particle size greater than 150 microns and said second powder's particles have a particle size less than 150 microns.

5. The electrochemical cell of claim 1, wherein the first powder's particles have an average elongation index value that is at least 3.5 percent higher than an average elongation index value of the second powder's particles.

6. The electrochemical cell of claim 1, wherein the first powder's particles have an average elongation index value that is at least 4.0 percent higher than an average elongation index value of the second powder's particles.

7. The electrochemical cell of claim 1, wherein said first powder is formed in a first powder manufacturing process, said second powder is produced in a second powder manufacturing process and said first and second powder manufacturing processes are different from one another.

8. The electrochemical cell of claim 7, wherein said powder manufacturing processes are selected from the group consisting of centrifugal atomization, gas atomization, and impulse atomization.

9. The electrochemical cell of claim 1, wherein said first powder and said second powder are zinc alloys comprising the same chemical elements.

10. The electrochemical cell of claim 9, wherein the quantities of said chemical elements in said alloys are the same.

* * * * *